Dec. 5, 1944.  H. A. KENT  2,364,536

METHOD OF PROCESSING CARBON ELECTRODES

Filed Aug. 13, 1943

INVENTOR:
Henry A. Kent,
BY
Spencer, Marzall, Johnston & Cook,
Attys.

Patented Dec. 5, 1944

2,364,536

UNITED STATES PATENT OFFICE 2,364,536

METHOD OF PROCESSING CARBON ELECTRODES

Henry A. Kent, Elmhurst, Ill., assignor to General Electric X-Ray Corporation, Chicago, Ill., a corporation of New York Application August 13, 1943, Serial No. 498,581

10 Claims. (Cl. 316—1)

This invention relates in general to electrodes for devices for discharging electrons and more particularly to a method of treating carbon electrodes for use as anodes in vacuum tubes operated at high voltage.

The advantages of using graphite electrodes as anodes are well known. Various methods have been devised for treating graphite electrodes to improve their performance in electron discharge tubes but none has accomplished the elimination of graphite particles to an extent necessary to the satisfactory use of such electrodes in high voltage operations where the field gradients are of such magnitude as to make necessary the elimination of graphite particles. An important object of this invention is the provision of a method for eliminating particles of graphite from such electrodes and so avoid the destructive effects of their presence in tubes used in high voltage operations. Additional objects, advantages and capabilities inherent in this invention will become readily apparent from the description thereof which follows.

In the present invention a graphite electrode of standard commercial production for use as an anode in vacuum tubes, which has been subjected to conventional processes for the elimination of volatile matter, such as high temperature, high vacuum firing in an Arsem furnace, is preferably used. This graphite electrode is first sandpapered, or otherwise smoothed, and polished with silk or rayon, or other suitable material, to produce a fine finish, that is, a smooth surface of fine grain without projections. The electrode is then heated to eliminate moisture but at a temperature well below the oxidizing temperature of the material of the electrode. The electrode is then immersed in a beaker of liquid air until boiling ceases, the duration of the immersion depending on the mass of electrode. After immersion the electrode is allowed to return to normal room temperature preferably in a dry atmosphere to prevent frosting. It is then subjected to the usual vacuum tube processing.

Instead of liquid air, liquid oxygen or liquid nitrogen may be used for the immersion bath.

Electrodes subjected to the described treatment retain a high polish. Eliminated particles of graphite float as scum in the liquid and thus may be readily removed.

Figure 1:
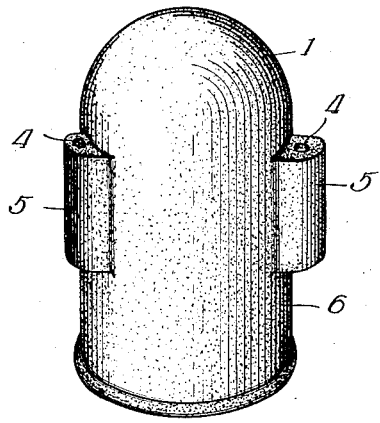
Figure 2:
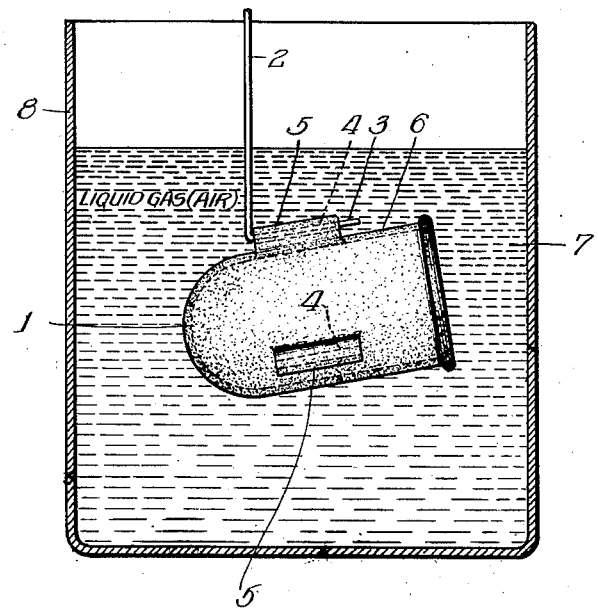

Greatly improved results have been obtained from graphite anodes subjected to the described treatment. Apparatus suitable for the treatment of one form of carbon electrode, for use as an anode in a vacuum tube operated at high voltage, is shown in the drawing in which Fig. 1 is a perspective view of a graphite electrode, and Fig. 2 is a side elevation, partly in section, of a receptacle containing liquid gas with a carbon electrode immersed therein and means for supporting the electrode.

In the drawing, the carbon electrode 1 is supported by a wire 2 having a bent portion 3 extending within an opening 4 in a lug 5 arranged on the outer surface 6 of the electrode, as immersed in liquid gas 7 contained in a receptacle or beaker 8. The electrode shown is generally cup shaped and closed at one end and therefore is supported in slightly tilted position in order to permit the escape of gases from within the hollow portion of the electrode.

The drawing is merely illustrative of one form of apparatus suitable for practicing the invention in the case of one form of carbon electrode. Naturally the form of apparatus employed in practicing the invention will be adapted to the form of electrode to be treated. Any suitable form of receptacle and supporting means may be used for this purpose.

The present invention is advantageous to the treatment or processing of carbon electrodes by providing an exceedingly fine finish, making the same solid throughout, and eliminating particles of carbon from the surface thereof.

Changes may be made in the described method without departing from the spirit of the invention, and the right is hereby reserved to make all such changes which fairly fall within the scope of the following claims.

The invention is hereby claimed as follows:

1. The method of processing a carbon electrode comprising the step of immersing the electrode in a liquid gas.

2. The method of processing a carbon electrode comprising the step of immersing the electrode in a liquid gas until boiling ceases.

3. The method of processing a carbon electrode comprising the steps of immersing the electrode in a liquid gas until boiling ceases, and allowing the electrode to return to room temperature in a dry atmosphere.

4. The method of processing a carbon electrode comprising the steps of heating the electrode to eliminate moisture therefrom, immersing the electrode in a liquid gas until boiling ceases, and allowing the electrode to return to room temperature in a dry atmosphere.

5. The method of processing a carbon electrode comprising the steps of polishing the electrode to a fine finish, heating the electrode to eliminate moisture therefrom, immersing the electrode in a liquid gas until boiling ceases, and allowing the electrode to return to room temperature in a dry atmosphere.

6. The method of processing a carbon electrode comprising the steps of heating the electrode to eliminate moisture therefrom, immersing the heated electrode in a liquid gas until boiling ceases, and allowing the electrode to return to room temperature in a dry atmosphere.

7. The method of processing a carbon electrode comprising the step of immersing the electrode in liquid air until boiling ceases.

8. The method of processing a carbon electrode comprising the step of immersing the electrode in liquid oxygen until boiling ceases.

9. The method of processing a carbon electrode comprising the step of immersing the electrode in liquid nitrogen until boiling ceases.

10. The method of processing a graphite electrode for use as an anode in a vacuum tube at high voltage consisting in the steps of heating the electrode to eliminate volatile matter therefrom, immersing the heated electrode in a liquid gas until boiling ceases, and allowing the electrode to return to room temperature in a dry atmosphere.

HENRY A. KENT.